(12) United States Patent
Kreuzburg

(10) Patent No.: US 6,330,619 B1
(45) Date of Patent: Dec. 11, 2001

(54) METHOD OF SYNCHRONIZATION

(75) Inventor: Rainer Kreuzburg, Paderborn (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/254,307

(22) PCT Filed: Jul. 24, 1997

(86) PCT No.: PCT/DE97/01564

§ 371 Date: Mar. 3, 1999

§ 102(e) Date: Mar. 3, 1999

(87) PCT Pub. No.: WO98/10347

PCT Pub. Date: Mar. 12, 1998

(30) Foreign Application Priority Data

Sep. 4, 1996 (DE) .............................. 196 35 915

(51) Int. Cl.[7] .................................... G06F 9/46
(52) U.S. Cl. .......................... 709/400; 713/502
(58) Field of Search ................... 709/102, 104, 709/400; 713/400, 502

(56) References Cited

U.S. PATENT DOCUMENTS

| | | | | |
|---|---|---|---|---|
| 4,325,120 | * | 4/1982 | Colley et al. ................. | 711/202 |
| 5,278,975 | * | 1/1994 | Ishihata et al. ................ | 709/400 |
| 5,448,732 | * | 9/1995 | Matsumoto .................... | 709/104 |
| 5,561,784 | * | 10/1996 | Chen et al. .................... | 711/157 |
| 5,958,019 | * | 9/1999 | Hagersten et al. ............. | 709/400 |

OTHER PUBLICATIONS

Polychronopoulos, "Compiler Optimizations for Enhancing Parallelism and Their Impact on Architecture Design", IEEE Transactions on Computers, vol. 37, No. 8, Aug. 1988, pp. 991–1004.

Ben–Ari, "Principles of Concurrent and Distributed Programming", Technion—Israel Institute of Technology, Chapter 3, Prentice–Hall 1990.

Tanenbaum, "Operating Systems: Design and Implementation", Chapter 2.2: "Interprocess Communications", Prentice Hall 1987.

IBM Technical Disclosure Bulletin, "Barrier Synchronization Using Fetch–and–Add and Broadcast", vol. 34, No. 8, Jan. 1992.

Arenstorf et al., "Comparing Barrier Algorithms", Parallel Computing, vol. 12, No. 2, 1989, pp. 157–180.

Herlihy et al., "Lock–Free Garbage Collection for Multiprocessors", IEEE Transactions on Parallel and Distributed Systems vol. 3, No. 3, 1992, pp. 304–311.

* cited by examiner

Primary Examiner—Dennis M. Butler
(74) Attorney, Agent, or Firm—Schiff Hardin & Waite

(57) ABSTRACT

A method for synchronization of concurrently running processes, in which, before it starts, each process is assigned a memory word which can be changed only by this process but can be read by all the other processes involved. This memory word is incremented twice for each synchronization step. Before each incrementation, a process waits until the memory word assigned to it is less than or equal to the values in the other memory words.

7 Claims, 1 Drawing Sheet

METHOD OF SYNCHRONIZATION

BACKGROUND OF THE INVENTION

1. Field of the Invention

The present invention relates to a method for synchronization of processes in multiprocessor systems.

2. Description of the Related Art

A known problem in data processing systems having a plurality of processes is that of synchronization of the processes. Until now, common memory locations, called semaphores, have been used for this purpose. However, these have to be handled by specific machine instructions which cannot be interrupted or make the interruption identifiable. This problem has been dealt with in a large number of publications, for example in Section 2.2 "Interprocess Communication" of the book "Operating Systems: Design and Implementation" by Andrew S. Tanenbaum, Prentice-Hall 1987.

However, particularly in multiprocessor systems, there is a problem in providing a suitable, non-interruptable instruction. Furthermore, conventional programming languages do not support such instructions. Synchronization methods are thus also known in which the only requirement is for a loading instruction as other memory instruction to be carried out automatically. The methods known for this purpose are described, by way of example, in Section 3 of the book "Principles of Concurrent and Distributed Programming" by M. Ben-Ari, Prentice-Hall 1990, ISBN 0-13-711821-X.

The methods described there achieve the object that an item of equipment can only ever be used by one process at any given time, and all the other processes wait for their "turn in line".

However, when multiprocessor systems are being started, a different type of problem arises in the phase synchronization of concurrently running processes. In this case, the starting processes on the individual processors can admittedly run simultaneously, but they comprise a plurality of phases which are intended to run as simultaneously as possible, although no starting process is intended to commence the next phase before all the other processes have completed the current phase.

SUMMARY OF THE INVENTION

An object of the invention is thus to provide an operating method which allows the phase of a number of concurrently running processes in microprocessor systems to be synchronized, as far as possible without any specific instruction being required.

The invention achieves this object and other objects by assigning each process, before it starts, its own memory word, which can be changed only by this process but can be read by all the other processes involved. This memory word is incremented twice for each synchronization step. Before each incrementation, a process waits until the memory word assigned to it is less than or equal to the values in the other memory words.

DETAILED DESCRIPTION OF THE PREFERRED EMBODIMENTS

Figure 1:
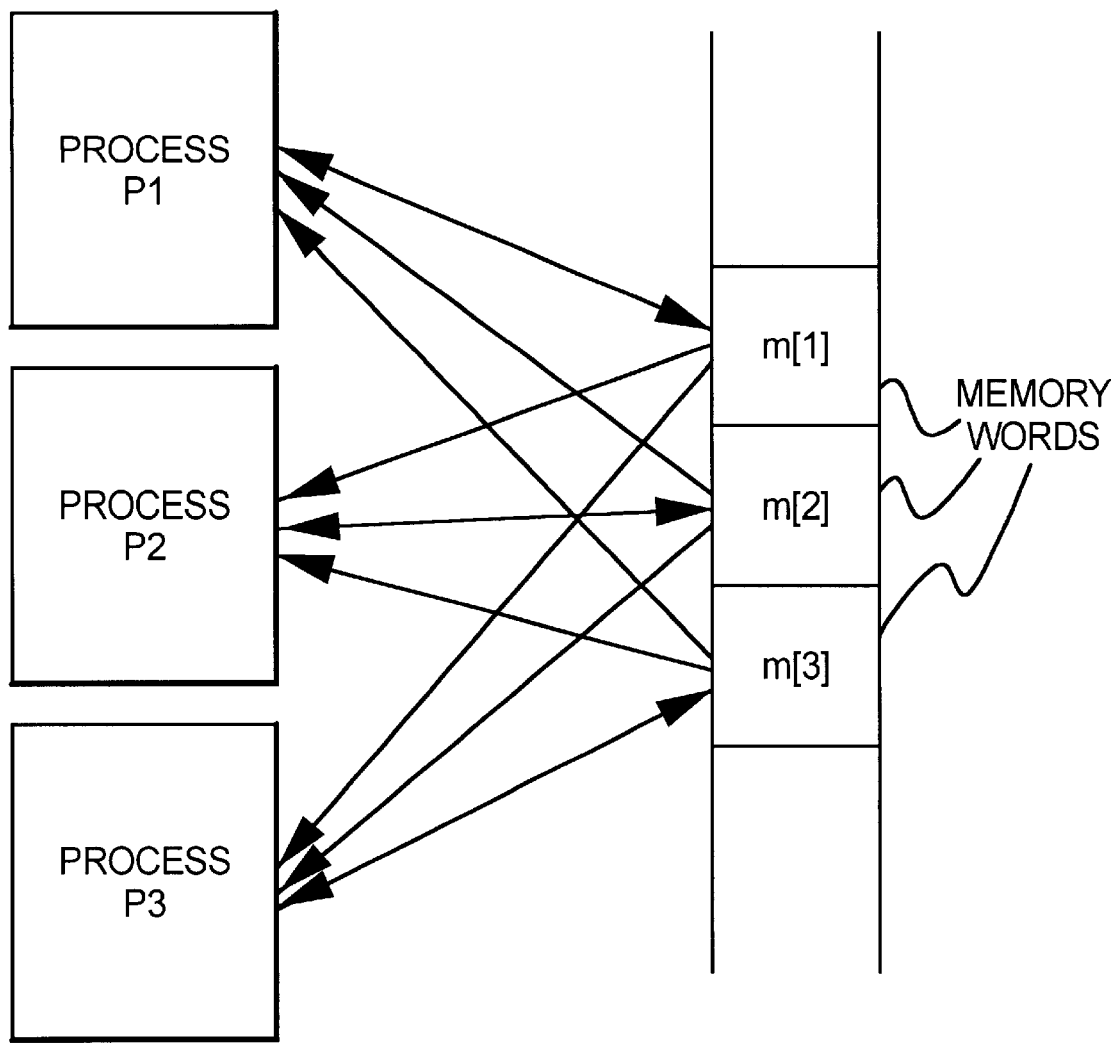
FIG. 1 is a schematic diagram which shows three processes whose access to the synchronization memory words is indicated by arrows.

The invention is described using the example of a multiprocessor system having a common, coherent memory.

When the system is being started, operating processes are started on all the processors, which processors determine and control the items of equipment or resources in a plurality of phases, as well as carrying out checks to ensure correct operation. These phases are intended to run synchronously in such a manner that each process starts the next phase only when all the other processes have completed the previous phase.

Each process uses its own memory word for this process, which can be changed only by this process but can be read by all the other processes. As an illustration, FIG. 1 shows three processes P1, P2 and P3 to which the memory words m[1], m[2] and m[3] are assigned, with the arrowheads indicating that only the process P1 can write the memory word m[1], although the other processes P2 and P3 could read it. Each of the memory words m[1], m[2] and m[3] is zeroed at the start of the processes, for example by the device which starts the processes. This may be an initialization process which is active on one of the processors, which zeroes the memory locations in accordance with a previously defined assignment and then transmits a start address as well as a message via a signalling device to the controller of the processors, to the effect that the start inhibit should be cancelled. After the normal initialization steps for each process, the first phase to be synchronized is commenced by each processor incrementing its own memory word. At the end of the phase, each process then checks whether all the other processes have already commenced this first phase. This can be identified by the fact that their memory words contain the number 1. If this is not yet the case, that is to say at least one of the memory words is still at the value 0, this is an indication that this process has not yet commenced the first phase, and it is necessary to wait. If, in contrast, the situation is that the other memory words do not have smaller contents, then the processor increments its own memory word, which thus assumes the value 2. Since this is done by all the processes, this will be true for all memory words shortly after all the processes have ended this first phase. It should be mentioned that, once the first process has incremented its memory word from 1 to 2, the other processes, which have previously "seen" one memory word with 0 and the others with 1 now "see" one memory word with 2 and the others with 1, in which case it is merely a coincidence as to whether the memory word with 2 is that which was previously 0, or is one of the others.

Before the start of the next phase to be synchronized, a check is carried out in the same way as before to confirm that all the other memory words are not less than the process's own word. In the example, the process's own word has the value 2 as an indication that the first phase has ended. If another process was still in the first phase, its memory word would still be at the value 1, and the process with the value 2 in its memory word would have to wait. If, in contrast, all the other memory words are equal or greater, each process can commence the second phase by setting its own memory word to the value 3. At the end of this second phase, a check is once again carried out to confirm that all the processes have commenced this second phase, that is to say have the value 3 in their memory word, and only then is the second phase terminated by incrementing the memory word to 4, once all the other processes have reached at least the value 3 and have thus commenced the second phase.

This sequence in the preferred embodiment can be represented as pseudocode, in which case m[1] denotes the memory location of the i-th processor, also called a milestone for short in the following text. "j" is the number of the executing processor, so that m[j] represents its own milestone. The programs on each of the processors, which may all be completely identical, but do not need to be, contain a function s_wait() as follows:

```
s_wait ():
  repeat
    go_on = true
    for i do
      if m[i] < m[j]
        then go_on = false
  until go_on
  m[j] = m[j] + 1
  return
```

By being questioned repeatedly, this function waits until the milestones of all the other processors have at least the same value as its own milestone. As a rule, they will all have the same value. However, since this situation allows any process to increment the milestone at the same time, a question asking for equality is incorrect.

A function 1_sync() is used for synchronization between the end of one phase and the start of the next phase, in which function the function s_wait() is just called twice:

```
1_sync ():
  s_wait ()
  s_wait ()
  return
```

Each process thus has, for example, the following structure:

```
main ():
  init ()        -- m=0
  1_sync ()
  phase1 ()      -- m=2
  1_sync ()
  phase2 ()      -- m=4
  1_sync ()
  ...            -- m=6
  return
```

The value of the process's own milestone, as it will be while the phase is being carried out, is in each case quoted as a comment after the double hyphen. The value is one greater than in the previous description, since in order to simplify the programming, a superfluous synchronization step is carried out at the start.

This embodiment is particularly advantageous if identical program code is executed simultaneously on different processors, but the individual phases are intended to run successively in synchronism.

Alternatively, the synchronization function s_wait() can also be used individually. To this end, in a manner corresponding to the first description above, each odd value m of a milestone is regarded as "Phase (m+1) mod 2 commenced", and each even value is regarded as "Phase m mod 2 ended". It is then possible without any further problems for each process to carry out other instructions between two synchronized phases, for which instructions it is irrelevant whether they overlap with another process which is in the previous phase or the next phase.

It is thus evident that the synchronization step s_wait() ensures that all the other processes have a milestone number which is either immediately before (one less than), or equivalent to (equal to) or immediately after (one greater than) the respective current milestone numbers. In addition, it is also known that, as long as one of the other milestone numbers is less than the process's own number, none may be greater than it at the same time. However, since this situation can change asynchronously at any time, this condition may be contravened even when access is next made. If, in contrast, one of the other milestones is greater than the process's own milestone, then this situation remains unchanged until the process's own milestone is incremented.

A check for correct synchronization can then be carried out by forming the difference for comparison. This difference may assume only one of the three values "0", "1" and "−1". If this is not the case, a synchronization error has occurred, so that a fault signal is produced and, for example, the system start is terminated with a fault message for the maintenance technician.

The sequence described so far has represented a situation in which a relatively small and previously defined number of phases need to be synchronized, so that one memory word is sufficient for counting, without any overflow occurring. However, it is also possible to use the invention when a number of the phases are repeated iteratively, and the number is thus not known before the start of each process.

In this case, instead of a sequence of natural numbers which may be regarded as being infinite, only the remainder of a division operation is used, by means of a common modulus. This can be done very efficiently when a number is represented in binary form, by the result of an arithmetic operation, in this case the imcrementing by one, being truncated at a number of binary digits corresponding to the modulus. For example, in the case of a modulus of "8", the sequence of numerical values is then "0", "1", "2", "3", "4", "5", "6", "7", "0", "1", . . . Accordingly, it is necessary to remember in the comparison that the contents of a memory location change from the maximum value, in this case "7", up to zero. Thus, for the purposes of the comparison required for this method, although "7" is still greater than "4", "5" and "6", it is less than "0", "1" and "2". This is shown in the following table:

|   | 0 | 1 | 2 | 3 | 4 | 5 | 6 | 7 |
|---|---|---|---|---|---|---|---|---|
| 0 | = | < | < | < | ? | > | > | > |
| 1 | < | = | > | > | > | ? | < | < |
| 2 | < | < | = | > | > | > | ? | < |
| 3 | < | < | < | = | > | > | > | ? |
| 4 | ? | < | < | < | = | > | > | > |
| 5 | > | ? | < | < | < | = | > | > |
| 6 | > | > | ? | < | < | < | = | > |
| 7 | > | > | > | ? | < | < | < | = |

The entries with question marks are irrelevant to the method.

If one forms the modulo difference, then this results in:

|   | 0 | 1 | 2 | 3 | 4 | 5 | 6 | 7 |
|---|---|---|---|---|---|---|---|---|
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |

-continued

|   | 0 | 1 | 2 | 3 | 4 | 5 | 6 | 7 |
|---|---|---|---|---|---|---|---|---|
| 6 | 2 | 3 | 4 | 5 | 6 | 7 | 0 | 1 |
| 7 | 1 | 2 | 3 | 4 | 5 | 6 | 7 | 0 |

It is thus evident that, for this method, the modulus difference is compared with half the modulus (in this case "4") and this is taken as the comparison result. Once again, if the sequence is correct here, only the values "0", "1" and "7" corresponding to "−1" are possible.

Instead of subtraction of two milestone values, the increment can also be added to a milestone value or subtracted from it, so that the function s_wait() would then be:

```
s_wait ():
    delta = 1
    repeat
        go_on = true
        for i do
            if m[i] = m[j] − delta
                then go_on = false
            if m[i] = m[j]
                then continue next i
            if m[i] = m[j] + delta
                then continue next i
            otherwise
                error
    until go_on
    m[j] = m[j] + delta) mod modulus
    return
```

The modulo function in the last but one line is expediently reached by truncating the binary representation. The value of "delta" may also not be equal to 1, for example 16, without the method being adversely affected, as long as it is a factor of the modulus. A processor can then signal a fault in a simple manner by adding an error value less than the "delta" value to its milestone; the sequence is thus blocked in an easily identifiable manner.

Further variants in accordance with known programming techniques are possible.

Although other modifications and changes may be suggested by those skilled in the art, it is the intention of the inventor to embody within the patent warranted hereon all changes and modifications as reasonably and properly come within the scope of his contribution to the art.

What is claimed is:

1. A method for synchronization of at least two concurrently running processes which run in a data processing system, comprising:

assigning each process its own memory location which is changed only by the process assigned to the respective memory location but can be read by all the processes to be synchronized;

forming an ordered sequence of possible contents of the memory locations which is interpreted in a same way by all the processes;

providing elements of said contents of said memory locations which can be compared to determine whether the contents of a first memory location are less than the contents of a second memory locations;

performing a synchronization step including each process comparing its own memory location with all the other memory locations, and regarding the synchronization step as having been carried out when none of the other memory locations has a value which is less than a value of its own memory location, in a successful synchronization step, setting the memory location which is assigned to the respective process to a next element in the ordered sequence.

2. A method as claimed in claim 1, further comprising the step of:

synchronizing phase steps of the processes by in each case two immediately successive synchronization steps.

3. A method as claimed in claim 1, further comprising the step of:

using a sequence of integers in a binary representation of a memory location as the ordered sequence.

4. A method as claimed in claim 1, further comprising the steps of:

using residues of a sequence of natural numbers modulo a modulus as the ordered sequence, and a first number being less than a second number if a difference between the residues is less than half the modulus.

5. A method as claimed in claim 1, further comprising the steps of:

carrying out a comparison by forming a difference, and producing an error signal if the difference is other than 0, 1 or −1.

6. A method as claimed in claim 1, further comprising the steps of:

carrying out a comparison by addition of a predetermined difference between two numbers in the ordered sequence for one of the two memory locations to be compared to produce a result, comparing the result for equality with the other memory location, and producing an error signal if neither the result nor the one memory location is equal to the other.

7. A method as claimed in claim 1, further comprising the step of:

carrying out a comparison by subtraction of the predetermined difference between two numbers in the ordered sequence for one of the two memory locations to be compared to produce a result, comparing the result for equality with the other memory location, and producing an error signal if neither the result nor the one memory location is equal to the other.

* * * * *